UNITED STATES PATENT OFFICE.

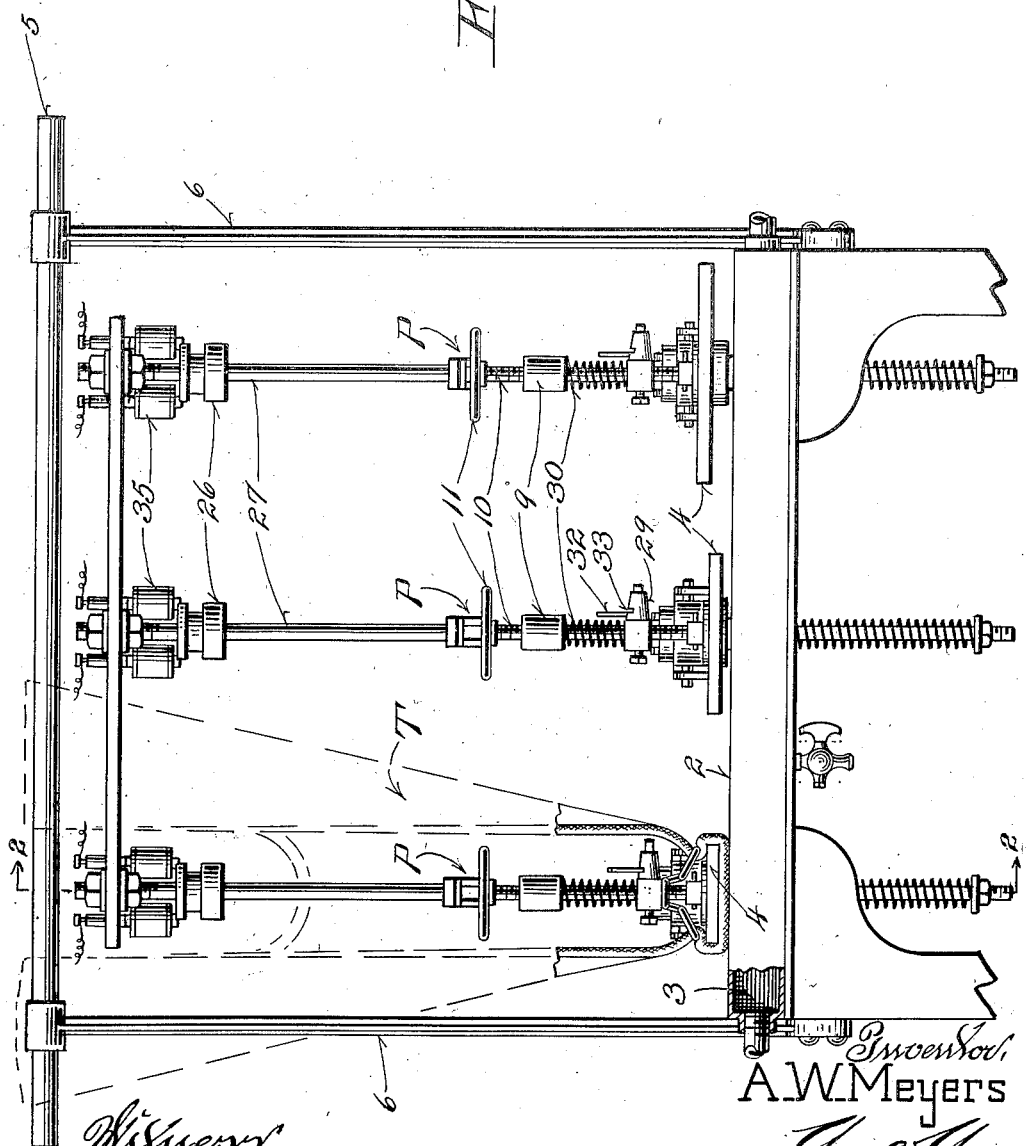

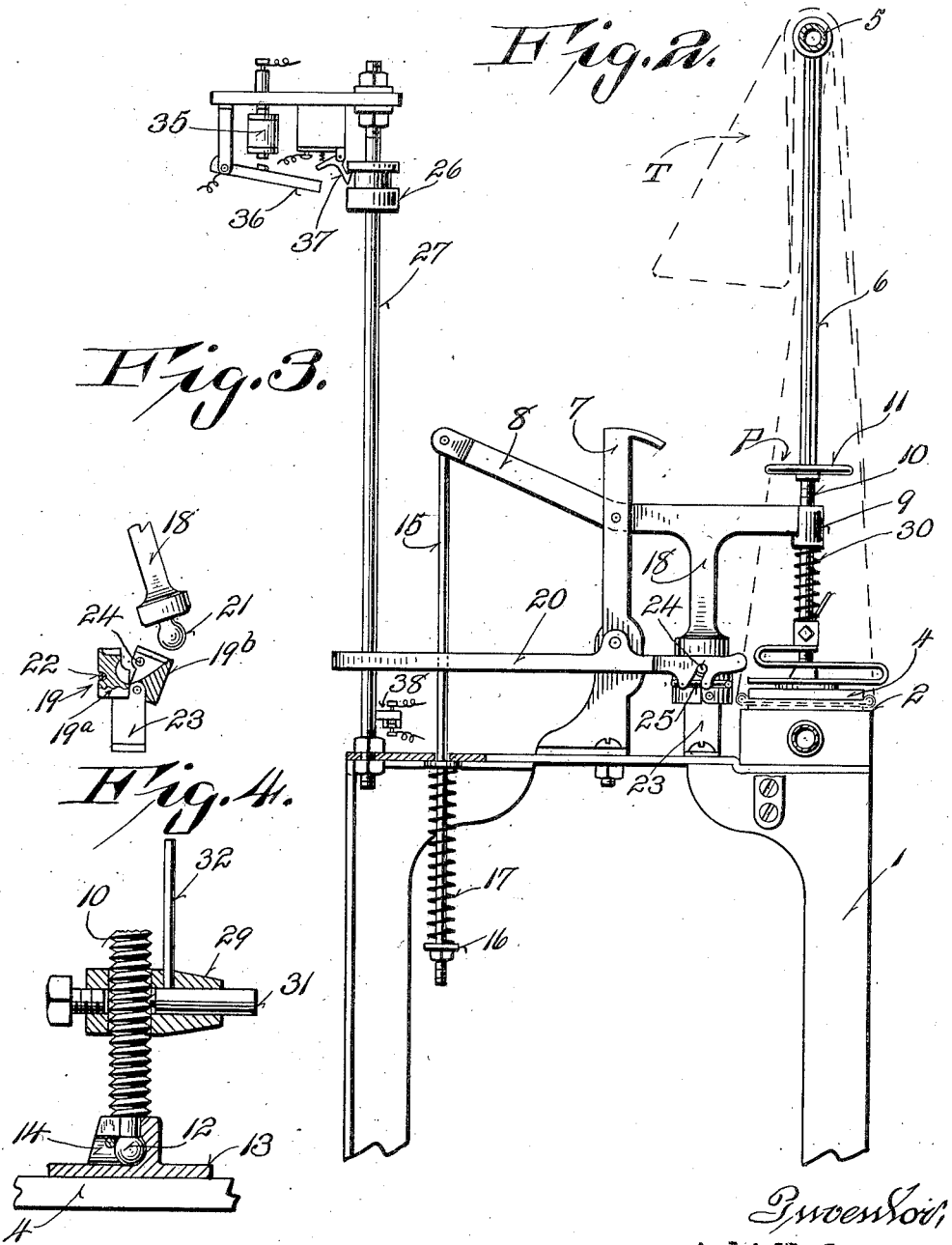

ALBERT W. MEYERS, OF MILWAUKEE, WISCONSIN.

TIRE-VULCANIZING MACHINE.

1,358,770.           Specification of Letters Patent.      Patented Nov. 16, 1920.

Application filed March 6, 1920. Serial No. 363,701.

*To all whom it may concern:*

Be it known that I, ALBERT W. MEYERS, a citizen of the United States, and resident of Milwaukee, in the county of Milwaukee and State of Wisconsin, have invented certain new and useful Improvements in Tire-Vulcanizing Machines; and I do hereby declare that the following is a full, clear, and exact description thereof.

This invention pertains to improvements in machines adapted particularly for the vulcanization of tires, but which may be used successfully in the heat treatment of analogous articles.

In tire repair establishments, it is desirable to eliminate as much as possible all element of chance, and to reduce the tire vulcanization processes to as automatic a basis as possible. When there are several vulcanizers in use at the same time, the operator frequently forgets or neglects to discontinue the vulcanizing operation at the proper time.

It is therefore the principal object of the present invention to provide a machine which will not be dependent upon manual operation for discontinuing the vulcanizing process after a predetermined interval of time, but will be entirely automatic. In this connection the time controlling apparatus described and claimed in my co-pending application for patent on improvements in automatic switchboards, filed August 9th, 1920, Serial No. 402,197, is used with the machine shown herein, in which:

Figure 1 represents a front elevational view of the battery of tire vulcanizers incorporated in a single machine.

Fig. 2 is a vertical transverse sectional view taken substantially on the plane of the line 2—2 of Fig. 1.

Fig. 3 is a detail sectional view of a part of the means for retaining the pressing member of each of the vulcanizers in operative position, and Fig. 4 is a detail vertical sectional view on an enlarged scale with a portion of a pressing member and its supporting element.

Although in Fig. 1 I have illustrated only three vulcanizers, it will be obvious from the succeeding description that the operation of each of them will be the same regardless of the number assembled together in one machine. In other words by increasing or decreasing the size of the table 1 and the vulcanizing plate 2, the number of pressing devices P which are mounted thereover may be varied. Since the invention does not consist in the number of pressing devices used, and inasmuch as each is substantially the same, a complete description of one will suffice.

This vulcanizing plate 2 forms the flat upper surface of a steam box 3 through which steam is permitted to flow from any suitable source of supply. It is obvious that in case it is not convenient to supply steam the vulcanizing plate may form an element of an electrically operated vulcanizing member. The inner tube T or other article to be vulcanized is held against the plate 2 a predetermined length of time by a pressing plate 4 of wood or similar material carried by the pressing device P, and in the present embodiment of the invention, said inner tube has that portion which is not being operated upon supported by a crossbar 5 which connects the upper ends of standards 6 secured to the ends of the table 1 as shown.

Intermediate the width of the table 1 is secured a bracket post 7, adjacent the upper end of which is pivoted a lever 8, one end of said lever having an internally threaded bearing sleeve 9. A threaded stem 10 is adjustably disposed in said sleeve 9 and is movable therein by the rotation of a handwheel 11 on its upper end. The hereinbefore referred to pressing plate 4 is mounted on the lower end of said stem, the latter being ball-shaped as at 12 for rotation in an open-ended socket 13 secured to said plate 4. The joint between the pressing plate and its stem is thus capable of universal movement to a limited degree to permit the inner tube T to be evenly forced against the vulcanizing plate 2. Furthermore the open-ended socket permits the pressing plate to be readily removed from its stem by taking out the pin 14 so that plates of various sizes may be utilized. As shown in Fig. 1, each of the pressing devices P is equipped with a pressing plate of a different size. The end of the lever 8 opposite the sleeve 9 has a spring rod 15 pivoted thereto, which rod extends downwardly through the table 1 and has an adjustable stop 16 on its lower end, said stop being adapted to have one end of an expansile coil spring 17 bear thereagainst. The opposite end of this spring engages the side of the table 1 so that the lever 8 is continuously urged about its pivot in such a direction as to move the pressing plate 4 away from the vulcanizing plate 2. This tendency is overcome by the retaining means including a locking leg 18 depending from the lever 8, a split retaining socket 19 and a latch bar 20.

The leg 18 has a ball 21 on its lower end for engagement in the cavity of the socket 19, the parts of which are urged toward each other by a band-spring 22 encircling the same. From Fig. 2 it will be seen that the retaining socket 19 is mounted on a bracket 23, and from Fig. 3 it will be noted that the section 19$^a$ of said socket is stationary, while the other section 19$^b$ is pivoted and is urged toward the first section by said spring 22.

A locking pin 24 projects from the section 19$^b$ of the retaining socket and is designed to be engaged in an inclined notch 25 formed in one end of the latch bar 20 The latter is pivoted intermediate its ends to the post 7 so that when the end having the notch 25 is moved downwardly to engage the locking pin 24, the two parts of the retaining socket will be securely held together, and if the ball 21 of the locking leg 18 is in said socket, the pressing plate will be retained in operative position against the urging action of the spring 17 until the latch bar is forcibly disengaged from the locking pin 24.

This last mentioned operation may be either procured manually by pressing downwardly on the end of the latch bar remote from the notch 25, or by an automatic release mechanism controlled by the apparatus shown and described and claimed in the co-pending application above referred to. That is to say a weight 26 positioned at the upper end of a guide-rod 27 is released and drops upon said end of the latch bar 20 which is disposed adjacent the lower end of said rod 27.

In connection with the pressing plate 4, I provide a clamp member 28 which co-operates therewith for holding the inner tube flat against the under surface thereof. This member 28 is preferably formed of a single piece of heavy gage spring wire first bent into substantially V-shape, the legs of the V being then bent into S-shape in side view as seen from Fig. 2. In use this member 28 straddles the stem 10 and the free ends of the wire from which it is formed engage the outer surfaces of the inner tube on each side of the pressing plate 4 as seen from Fig. 1.

Slidably disposed on the stem 10 is a follower 29 and an expansile coil spring 30, the latter being located between the follower and the sleeve 9, the former being adapted to rest upon the clamp member 28. Thus the tension of the spring 30 urges the follower against the clamp member which in turn forces the inner tube to snugly engage the pressing plate 4. The follower 29 has a sliding pin 31, the inner end of which is pointed to engage between the threads on the stem 10 when it is forced theretoward by the camming action exerted by a handle 32 extending from the pin and an inclined slot 33 cut in the follower.

In other words by moving the handle 32 in the proper direction, the pin 31 may be shifted either toward or away from the stem 10. When the machine is in operation, the pin 31 is out of engagement with the threads of the stem 10 so as to permit the exercise of the function of the spring 30. On the other hand when the inner tube is being adjusted on the pressing plate 4, it is necessary that pressure be released from the clamp member 28, therefore the follower is moved toward the bearing sleeve 9 and the pin 31 engaged with the screw threads to retain said follower stationary on the stem.

The operation of this invention is briefly as follows, it being assumed that the parts are out of operative position: The inner tube T or other article to be vulcanized after having been properly adjusted on the pressing plate 4, is moved toward the vulcanizing plate 2 by the downward movement of the front end of the lever 8. The operator while moving the lever thusly opens the split retaining socket 19 against the tension of the band spring 22 and allows the ball 21 of the locking leg 18 to enter the same. The mechanism is then completely set in its operative position upon the engagement of the notch 25 of the latch bar 20 over the pocket pin 24. Rotation of the hand-wheel 11 will shift the pressing plate 4 to procure the proper engagement between the inner tube and the vulcanizing plate 2.

The operation of the apparatus illustrated in the above referred to co-pending application is started substantially co-incidentally with the setting of the mechanism of this invention, and after a proper and predetermined interval of time the electro-magnet designated in this application by the numeral 35 is energized to attract an armature 36. When said armature is drawn toward the electro-magnet, a trip 37 is engaged and the weight 26 released, the same dropping upon one end of the latch bar 20. The latch bar being rocked upon its pivot and disengaged from the locking pin 24, the spring 17 will exert its force, which is greater than the tension of the band spring 22, to move the ball 21 of the locking leg 18 out of the split retaining socket 19, and also lifting the pressing plate and the portion of the inner tube carried thereby away from the vulcanizing plate 2. An alarm is sounded upon the engagement of the armature 36 with the trip 37 and the operation is subsequently discontinued when the weight contacts with a circuit breaker arm 38, all as set forth in said co-pending application.

From the foregoing description, taken in connection with the accompanying drawings, it will be seen that a very simply constructed automatic vulcanizing machine has been invented, the same being so constructed that it will effectively overcome the faults and defects present in like machines now on the market. Various changes may be made in the form and proportion and in the details of construction, in addition to those hereinbefore mentioned, without departing from or sacrificing any of the principles of the invention.

I claim:

1. In a machine of the class described, a curing plate, a pressing plate for carrying an article to be cured, means tending to urge the pressing plate away from the curing plate, means for holding the pressing plate adjacent the curing plate against the action of said urging means, and means for releasing the holding means to permit the operation of the urging means.

2. In a machine of the class described, a curing plate, a lever, a pressing plate connected with the lever for carrying an article to be cured, means urging said lever in a direction to move the pressing plate away from the curing plate, and detachable means engaged with said lever to hold the same against the actuation of said urging means.

3. In a machine of the class described, a curing plate, a lever, a pressing plate connected with the lever for carrying an article to be cured, means urging said lever in a direction to move the pressing plate away from the curing plate, a retaining member detachably engaged with a portion of said lever, and a latch for holding said retaining member in operative position.

4. In a machine of the class described, a curing plate, a supporting member, a pressing member including a pressing plate and a stem extending therefrom and held in said supporting member, a clamp member on said pressing member, and a spring for urging said clamp member toward the pressing plate.

5. In a machine of the class described, a curing plate, a supporting member, a pressing member including a pressing plate and a stem extending therefrom and held in said supporting member, a clamp member on said pressing member, a follower on said stem and engaged with the clamp member, and a spring for urging the follower and clamp member toward the pressing plate.

6. In a machine of the class described, a curing plate, a supporting member, a pressing member including a pressing plate and a stem extending therefrom and held in said supporting member, a clamp member on said pressing member, a follower on said stem and engaged with the clamp member, a spring for urging the follower and clamp member toward the pressing plate, and means for securing the follower at points spaced from the clamp member against the action of said spring.

In testimony that I claim the foregoing I have hereunto set my hand at Milwaukee, in the county of Milwaukee and State of Wisconsin.

ALBERT W. MEYERS.